C. BADIG & S. BERGER.
FUNNEL.
APPLICATION FILED JULY 12, 1913.
1,091,271.
Patented Mar. 24, 1914.
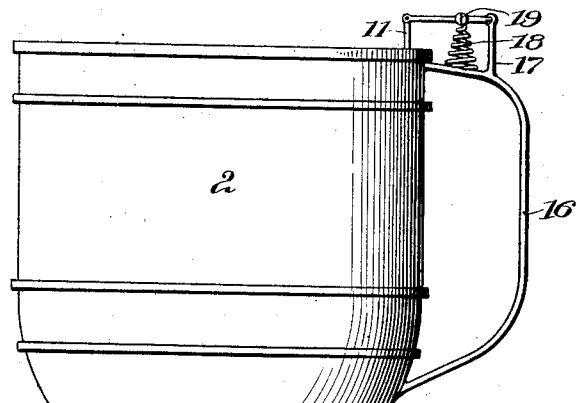
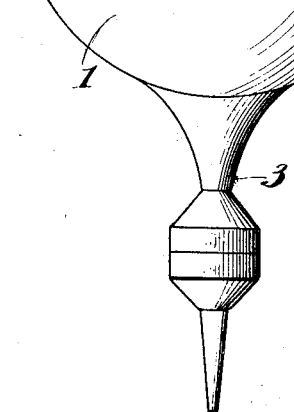
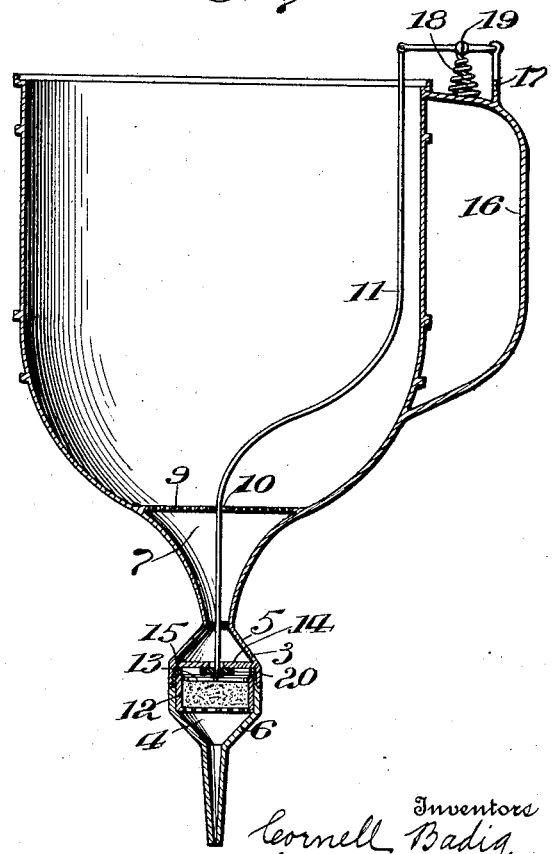
Witnesses
Inventors
Cornell Badig
and
Samuel Berger
By Arthur E. Wallace
Attorney

UNITED STATES PATENT OFFICE.

CORNELL BADIG AND SAMUEL BERGER, OF NEW YORK, N. Y.

FUNNEL.

1,091,271.  Specification of Letters Patent.  Patented Mar. 24, 1914.

Application filed July 12, 1913.  Serial No. 778,724.

*To all whom it may concern:*

Be it known that we, CORNELL BADIG and SAMUEL BERGER, citizens of the United States, residing at New York, in the county of New York and State of New York, have invented certain new and useful Improvements in Funnels, of which the following is a specification.

This invention relates generally to funnels, but more particularly to a combined strainer and filtering funnel; and it consists of the novel construction and arrangement of the several parts, and their combination, as will be hereinafter fully described in this specification and briefly set forth in the claim.

The chief object of the invention is to combine with a funnel certain improved devices, by means of which the liquid passing therethrough may be strained and thoroughly filtered, and the flow or passage of the liquid checked when desired.

Another object of the invention is to so construct and arrange the several parts, that the straining and filtering parts may be readily dismembered for cleaning purposes, and to renew certain parts when found necessary.

Other objects of the invention will become apparent upon a complete disclosure thereof.

In the drawing—Figure 1 is a side elevation of our combined funnel, strainer, and filterer, Fig. 2 is a central vertical section, and Fig. 3 is a similar section, somewhat enlarged, of the lower portion or spout in which the filtering device is located.

Referring to the several views, the numeral 1 indicates our improved funnel which is composed of a body or upper portion 2, preferably cup-shape, and a lower portion or spout 3 of unusual construction. The central portion of the spout is swelled or bulged to provide a filter-chamber 4, and access to this chamber is obtained by making the spout in two parts, an upper part 5 and a lower part 6, the part 6 being screwed into the part 5. In the opening 7 to the spout is seated a strainer-disk 9 having a central aperture 10 for the passage of a rod 11. Seated within the filter-chamber is a cup 12 on which is placed a suitable filtering material, such as cotton, held in place by a suitable skeleton weight 13. Situated above the upper edge of the cup is disk or plate 14, centrally apertured for the passage of the rod 11 and the strained liquid, and between said disk and cup edge is a rubber washer 15 to prevent leakage. The bottom of the cup 12 is perforated to provide for the passage of the filtered liquid through the lower portion of the spout.

The body of the funnel is provided with handle 16, and seated in the upper portion or head 17 of the handle is a coil spring 18 provided with a knob 19. The upper end of the rod 11 is bent at a right angle and secured to the knob, and the lower end of the rod is screw-threaded to receive a valve or check 20 adapted to close the central aperture of the disk or plate 14, so as to check or stop the flow or passage of the strained liquid to the filter, when desired. When used as a filtering funnel, a free passage for the liquid to the filter chamber is obtained by applying pressure to the knob 19, which forces the valve or stop 20 away from the central aperture in disk 14, the rod being held in its depressed position by any suitable or well-known means, or if desired the valve may be removed during the filtering operation. When the pressure is removed from the knob the spring returns the rod to its normal position, cutting off the flow of the liquid.

In using the device as an ordinary funnel the lower part of the spout is unscrewed, the filter removed, and the lower part screwed into place. If desired the rod and valve may also be removed, or the valve alone.

It will be obvious that the filtering material may be removed, when it becomes unfit for use, and new material substituted, and the parts cleaned.

Having thus described our invention, what we claim is:—

A funnel comprising a body portion and a spout, a filter chamber formed in the spout, a cup for receiving fibrous filtering material mounted in the chamber, an apertured disk mounted in the chamber above the cup, a spring restrained rod reciprocable in the spout and aperture of the disk, a valve mounted upon the lower end of the rod for normally closing the aperture to prevent passage of liquid therethrough, a weight of skeleton form mounted in the cup for slightly compressing the filtering material therein to prevent the valve from contacting with the material when the same is moved to uncover the aperture.

In testimony whereof we affix our signatures in presence of two witnesses.

CORNELL BADIG.
SAMUEL BERGER.

Witnesses:
HEINRICH STRAUSS,
EMANUEL SMIKOVITCH.

Copies of this patent may be obtained for five cents each, by addressing the "Commissioner of Patents, Washington, D. C."